(12) United States Patent
De Greef et al.

(10) Patent No.: US 9,952,423 B2
(45) Date of Patent: Apr. 24, 2018

(54) METHOD OF CONTROLLING AN ELECTROWETTING ELEMENT WITH STABLE FLUID CONFIGURATIONS

(71) Applicant: Amazon Technologies, Inc., Seattle, WA (US)

(72) Inventors: Petrus Maria De Greef, Waalre (NL); Gor Manukyan, Veldoven (NL)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/197,544

(22) Filed: Jun. 29, 2016

(65) Prior Publication Data
US 2018/0003946 A1     Jan. 4, 2018

(51) Int. Cl.
G02B 26/00     (2006.01)
G09G 3/36      (2006.01)

(52) U.S. Cl.
CPC .................. G02B 26/005 (2013.01)

(58) Field of Classification Search
CPC ...... G02B 26/005; G02B 26/004; G02B 1/06; G02B 2207/115; G02B 26/02; G02B 3/14; G02B 5/201; G02B 26/007; G02B 26/023; G02B 26/0841; G02B 27/0172; G02B 5/22; G02B 5/23; G09G 3/348; G09G 2300/0426; G09G 2300/0452; G09G 3/3433; G09G 2300/08; G09G 3/344; G09G 2230/00; G09G 2300/0465; G09G 2300/0809; G09G 2310/06; G09G 2310/061; G09G 3/2003; G09G 2300/04;
(Continued)

(56) References Cited

U.S. PATENT DOCUMENTS 9,207,450 B1    12/2015  Manukyan et al.
2008/0204370 A1  8/2008  Feenstra
(Continued)

FOREIGN PATENT DOCUMENTS

WO   2007141218 A1   12/2007
WO   2013087897 A1    6/2013

OTHER PUBLICATIONS

International Search Report and Written Opinion dated Oct. 12, 2017 for PCT Application No. PCT/EP2017/066172.

*Primary Examiner* — Brandi Thomas
(74) *Attorney, Agent, or Firm* — EIP US LLP

(57) ABSTRACT

Apparatus and a related method of controlling an electrowetting element of the apparatus. Display effect data is received which is indicative of a requested display effect for two electrowetting elements. Based on the display effect data, one of the electrowetting elements is switched to either: a state with a first fluid contacting substantially all of each of a first surface portion and a second surface portion of a support plate surface; or a state with the first fluid contacting part of the first surface portion and a second fluid contacting substantially all of the second surface portion and a second part of the first surface portion. The other electrowetting element is, based on the display effect data, switched to a state in which the first fluid contacts substantially all of a first surface portion and the second fluid contacts substantially all of a second surface portion. For each electrowetting element, the first surface portion lies in a different plane from the second surface portion.

20 Claims, 11 Drawing Sheets

(58) Field of Classification Search
CPC ... G09G 2300/0421; G09G 2300/0456; G09G 2300/0469
USPC ........ 359/228, 237, 245, 253–254, 265–267, 359/269, 271, 277, 290, 291, 295, 298, 359/315, 322; 345/60, 64, 103, 104, 105, 345/107, 108; 362/84, 561, 562
See application file for complete search history.

(56) References Cited

U.S. PATENT DOCUMENTS

| | | |
|---|---|---|
| 2015/0084942 A1 | 3/2015 | Mennen |
| 2016/0178890 A1 | 6/2016 | Massard |
| 2017/0003496 A1* | 1/2017 | De Greef ............. G02B 26/005 |

* cited by examiner

Receiving first display effect data indicative of a first requested display effect for display by the electrowetting element;

↓

Based on the first display effect data, determining a voltage value of a voltage to apply to a first electrode and a second electrode of the electrowetting element;
generating the voltage with the voltage value; and
outputting the voltage with the voltage value to be applied to the first electrode and the second electrode, to switch the electrowetting element to a state in which:
a first fluid contacts substantially all of a first surface portion of a surface of a support plate, the first surface portion lying in a first plane, and a second fluid immiscible with the first fluid contacts substantially all of a second surface portion of the surface, the second surface portion lying in a second plane different from the first plane;

↓

Receiving second display effect data indicative of a second requested display effect for display by the electrowetting element;

↓

Based on the second display effect data, determining the voltage value of the voltage to apply to the first electrode and the second electrode;
generating the voltage with the voltage value; and
outputting the voltage with the voltage value to be applied to the first electrode and the second electrode, to switch the electrowetting element to the state.

FIG. 8

Receiving display effect data indicative of a requested display effect for display by each of the first electrowetting element and the second electrowetting element;

For the first electrowetting element, and based on the display effect data:
determining a first voltage value of a voltage to apply to a first electrode and a second electrode of the first electrowetting element;
generating the voltage with the first voltage value; and
outputting the voltage with the first voltage value to be applied to the first electrode and the second electrode of the first electrowetting element, to switch the first electrowetting element to: a state a) or a state b).

For the second electrowetting element, and based on the display effect data:
determining a second voltage value of a voltage to apply to a first electrode and a second electrode of the second electrowetting element;
generating the voltage with the second voltage value; and
outputting the voltage with the second voltage value to be applied to the first electrode and the second electrode of the second electrowetting element, to switch the second electrowetting element to a state in which:
the first fluid contacts substantially all of a first surface portion of a second surface of the support plate, and
the second fluid contacts substantially all of a second surface portion of the second surface, the second surface portion lying in a second plane of the second electrowetting element different from the first plane of the second electrowetting element.

FIG. 9

METHOD OF CONTROLLING AN ELECTROWETTING ELEMENT WITH STABLE FLUID CONFIGURATIONS

BACKGROUND

In known electrowetting elements, it can be difficult to obtain stable fluid configurations for low grey-scale display effects. This can occur when switching fluids from an on state with a fluid configuration corresponding to a low grey-scale display effect, as there is a tendency for an oil fluid to form a layer covering a display area, to give a black display effect, despite applying a voltage for a fluid configuration corresponding to a non-black low grey-scale display effect.

It is desirable to improve the provision of low grey-scale display effects in an electrowetting element.

BRIEF DESCRIPTION OF THE DRAWINGS

FIGS. 8 and 9 show flow diagrams of methods according to examples.

DETAILED DESCRIPTION

Examples are described below of an electrowetting element comprising a fluid motion control structure. Such a structure may aid initiation of fluid motion within an electrowetting element. Moreover, with a first portion and a second portion of a surface of a support plate lying in different planes from each other, a stable state of the electrowetting element can be provided, for improving display of low grey-scale levels. Thus, if display effect data is received for a less stable low grey-scale level, the electrowetting element may instead be switched to the stable state. By tuning characteristics of the fluid motion control structure, for example a dielectric constant of a dielectric layer, or a width of a second surface portion or a height relative to a first surface portion, the stability and a corresponding grey-scale level can be designed into the element. For example, a desired range of voltage values corresponding to the stable state may be designed into the electrowetting element, to achieve a desired switching performance of the element.

Figure 1:
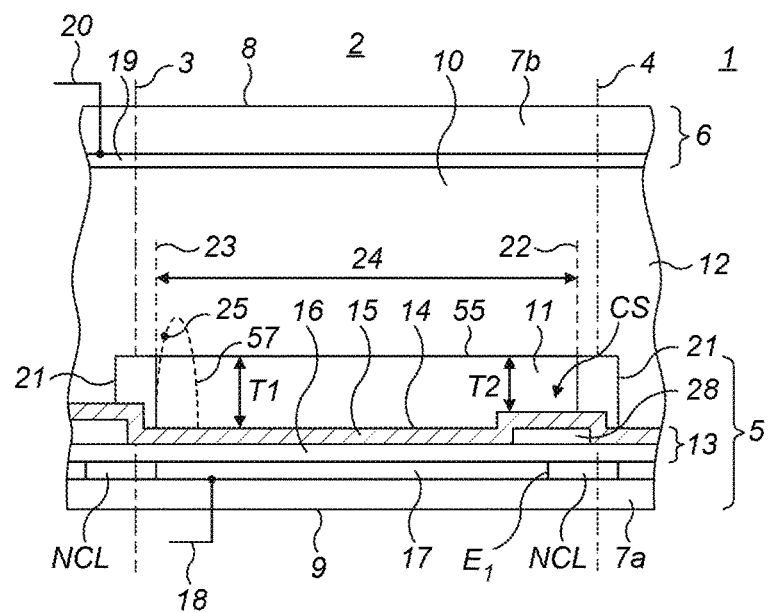
FIG. 1 shows schematically an electrowetting element in cross section according to examples.

FIG. 1 shows a diagrammatic cross-section of part of an example of an electrowetting display device 1. FIG. 1 is schematic in nature; the electrowetting display device 1 illustrated may in examples include further features not illustrated in FIG. 1. For example, the electrowetting display device 1 may include driving circuitry. The electrowetting display device 1 may be referred to as a display device and includes a plurality of electrowetting elements 2 which may otherwise be considered to be display elements or picture elements, each configurable to provide a display effect which together form an image displayed by the display device. An electrowetting element may in some examples be considered to be a pixel and in other examples a sub-pixel.

The electrowetting element 2 shown in FIG. 1. The lateral extent of the electrowetting element is indicated in the Figure by two dashed lines 3, 4. The electrowetting elements comprise a first support plate and a second support plate such as the first support plate 5 and the second support plate 6 referred to with reference to FIG. 1, which also form part of the electrowetting display device 1. The support plates may be separate parts of each electrowetting element, but the support plates may instead be shared in common by the plurality of electrowetting elements. The support plates may each include a glass or polymer substrate 7a, 7b and may be rigid or flexible.

The display device has a viewing side 8 on which an image or display effect formed by the display device can be viewed and a rear side 9. In the Figure a side of the first support plate 5 corresponds with the rear side 9; a side of the second support plate 6 corresponds with the viewing side 8; alternatively, in other examples, a side of the first support plate may correspond with the viewing side. The display device may be of the reflective, transmissive or transflective type. The display device may be an active matrix driven display device. The plurality of electrowetting elements may be monochrome. For a color display device the electrowetting elements may be divided in groups, each group having a different color; alternatively, an individual electrowetting element may be able to show different colors.

Figure 2:
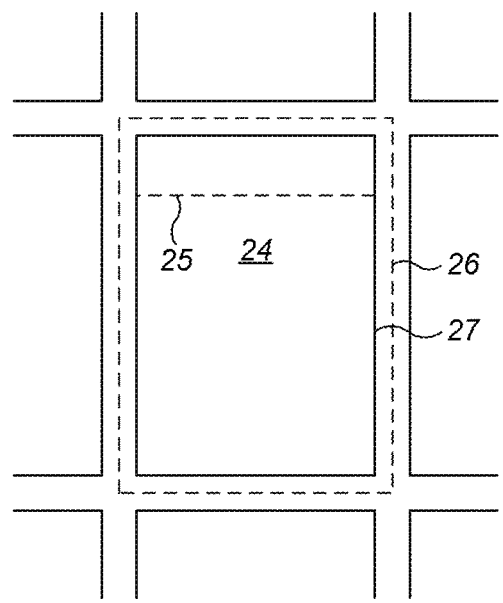
FIG. 2 shows schematically the electrowetting element in plan view.

The second support plate 6 is positioned such that a first fluid 11 and a second fluid 12 are located between the first support plate 5 and the second support plate 6, in the space 10. In the example of FIG. 2, each electrowetting element 2 includes a respective portion of the first fluid 11 and the second fluid is shared by the array of electrowetting elements. However, in other examples, each electrowetting element may include a portion of the second fluid, for example where the second fluid is not shared by the array of electrowetting elements. At least one of the first and second fluids may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which corresponds with a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of the first fluid is not mixed with the majority of the volume of the second fluid.

The second fluid is electrically conductive or polar and may be water, or a salt solution such as a solution of potassium chloride in water. In examples, the second fluid is polar and in some examples is electrically conductive, but in other examples is not electrically conductive. The second fluid may be transparent. The first fluid is typically electrically non-conductive and may for instance be an alkane like hexadecane or may be an oil such as silicone oil. The first fluid is therefore non-polar in at least some examples.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, for example absorb substantially all parts of the visible spectrum, or reflecting. A reflective first fluid may reflect the entire visible spectrum, making the layer appear white, or part of it, making it have a color. In some examples, the first fluid is black and therefore absorbs substantially all parts of the optical spectrum, for example in the visible light spectrum. In other examples, the first fluid is another color than black and absorbs another part of the optical spectrum, for example a sub-range of wavelengths within the visible spectrum. In other examples, the display device includes electrowetting elements having first fluids which are respectively red, green or blue, or cyan, magenta and yellow to provide a full color display. Typically, by absorbing substantially all parts of the optical spectrum, there is nonetheless a degree of variation. Therefore, the first fluid may not absorb all wavelengths, but the majority of wavelengths within a given spectrum such as the visible spectrum, so as to perform the function of the first fluid in the electrowetting element. The first fluid may therefore be configured to absorb substantially all light incident on the first fluid. For example the first fluid may absorb 90% or more of light in the visible spectrum and incident on the first fluid.

The first support plate 5 includes an insulating layer 13. The insulating layer may be transparent or reflective. The insulating layer 13 may extend between a wall 21 of an electrowetting element 2. To avoid short circuits between the second fluid 12 and electrodes arranged under the insulating layer, layers of the insulating layer may extend uninterrupted over a plurality of electrowetting elements 2, as shown in the Figure. The insulating layer has a surface 14 facing the space 10 of the electrowetting element 2 and may be considered to be a surface of the support plate 5. In this example the surface 14 is hydrophobic. The thickness of the insulating layer may be less than 2 micrometers and may be less than 1 micrometer. The surface is in contact with at least one of the first fluid or the second fluid, depending on the fluid configuration as described below.

The insulating layer may be a hydrophobic layer; alternatively, it may include a hydrophobic layer 15 and a further layer, such as a first dielectric layer 16, with predetermined dielectric properties, the hydrophobic layer 15 facing the space 10, as shown in the Figure. The hydrophobic layer is schematically illustrated in FIG. 2 and may be formed of Teflon® AF1600. The dielectric layer 16 of the insulating layer may have a thickness, taken in a direction perpendicular to the plane of the substrate, of between 5 nanometers and several micrometers, for example between 50 nanometers and 2 or 3 micrometers. In other examples the thickness may be between 50 nanometers and 500 nanometers. The dielectric layer may be made of an inorganic material like silicon oxide or silicon nitride.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each electrowetting element 2 includes an electrowetting element electrode 17 as part of the first support plate 5. In examples shown there is one such electrowetting element electrode 17 per electrowetting element, although in other examples some or all electrowetting elements may have more than one electrowetting element electrode. Such an electrode may be referred to herein as a first electrode. The first electrode is partly overlapped by the surface of the support plate bounded by at least one wall (which is also referred to as the display area). In other words, the first electrode may not extend to all sides of the electrowetting element, so that in examples there is an electrode free portion of the first support plate which is not overlapped by the first electrode, and which is overlapped by part of the display area. Viewed in plan view, the first electrode may therefore be considered to have a cut out, or notch, where there is an absence of the first electrode compared with the overlying display area. The shape of an edge E1 of the first electrode therefore determines an edge of the electrode free portion. The electrowetting element electrode 17 is electrically insulated from the first and second fluids by the insulating layer 13; electrowetting element electrodes of neighboring electrowetting elements are separated by an electrically non-conductive layer NCL which occupies a region of the first support plate where there is an absence of the first electrode. In other words, it may be considered that the notch of the first electrode is occupied by the non-conductive layer.

In some examples, further layers may be arranged between the insulating layer 13 and the electrowetting element electrode 17. The electrowetting element electrode 17 can be of any desired shape or form, and may be made of the transparent conductive material indium tin oxide (ITO). The electrowetting element electrode 17 of an electrowetting element is supplied with voltage signals by a signal line 18, schematically indicated in the Figure.

The electrowetting element of examples described herein, such as that of FIG. 1, comprises a fluid motion control structure CS. The fluid motion control structure comprises for example a dielectric layer 28 which is elsewhere herein referred to as a second dielectric layer 28. The second dielectric layer 28 is located between the electrode free portion and a second surface portion of the surface (described later). The second dielectric layer is for example formed of a suitable dielectric material which the skilled person would be familiar with and in examples contacts the first dielectric layer. In some examples the first dielectric layer and the second dielectric layer may be integrated as one dielectric layer, but in other examples are two discrete layers. The second dielectric layer overlaps the electrode free portion and also in some examples part of the first electrode 17. Thus, in examples, the second dielectric layer overlaps the edge E1 of the first electrode. The hydrophobic layer in examples is located in contact with the second dielectric layer, such that the surface 14 extends to cover the second dielectric layer. Details of the extent, dimensions and functionality of the second dielectric layer as part of the fluid motion structure will be described further below.

A second signal line 20 is connected to a second electrode 19 that is in electrical contact with the second fluid 12. Similarly to the electrowetting element electrode, the second electrode 19 may be made of ITO. The second electrode may be common to all elements, for example when they are fluidly interconnected by and share the second fluid, uninterrupted by walls. The electrowetting element 2 can be controlled by a voltage V applied between the signal lines 18 and 20 and hence between the electrowetting element electrode 17 and the second electrode 19, which is therefore a voltage applied to the electrowetting element. The electrowetting element electrodes on the substrate 7a are coupled to a display driving system, described further below. In a display device having the electrowetting elements arranged in a matrix form, the electrowetting element electrodes can be coupled to a matrix of control lines on the substrate 7a via the signal line 18. The signal line 20 may be coupled to a display driving system.

The first fluid 11 in this example is confined to an electrowetting element by walls 21 that follow the cross-section of the electrowetting element. The extent of the electrowetting element, indicated by the dashed lines 3 and 4 which correspond to sides of the electrowetting element, is taken between the centre of the walls. The area of the surface 14 between the walls of an electrowetting element, indicated by the dashed lines 22 and 23, may be referred to as the display area 24, over which a display effect occurs. The display effect depends on an extent that the first fluid and the second fluid adjoin the surface corresponding with the display area, in dependence on the magnitude of the applied voltage V described above. The magnitude of the applied voltage V therefore determines the configuration of the first and second fluids within the electrowetting element. In other words, the display effect depends on the configuration of the first and second fluid in the electrowetting element, which configuration depends on the magnitude of the voltage applied between the electrodes of the electrowetting element. For example, for controlling the configuration of the first and second fluids, a constant potential may be applied to the second electrode in contact with the conductive second fluid 12 and the magnitude of a potential applied to the electrowetting element electrode 17 on the substrate 7a may be controlled. The display effect gives rise to a display state of the electrowetting element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively. Thus, the display effect may in effect be controlled by controlling a configuration of the first fluid (and consequently the second fluid).

The first fluid 11 adjoins or contacts at least part of the display area 24 and therefore the surface 14. A size of a portion of the surface 14 adjoined by the first fluid depends on a voltage applied between the electrodes of the electrowetting element. In examples described herein, when a zero voltage is applied between the electrodes, for example when the electrowetting element is in an off state, the first fluid 11 forms a layer between the walls, as shown in FIG. 1 with the reference numeral 55. Such a state is for example referred to as a state a) in which the first fluid contacts substantially all of the first surface portion and the first fluid contacts substantially all of the second surface portion. The state a) may have a darker greyscale level than the second state described later. Typically, a fluid contacting substantially all of a surface or a surface portion adjoins or covers the surface or surface portion completely, except perhaps for trace amounts, droplets, or other negligible quantities of the fluid in question. Application of a non-zero voltage of sufficient magnitude will retract the first fluid, for example against a wall as shown by the dashed shape 57 in FIG. 1. The controllable shape of the first fluid, in dependence on the magnitude of applied voltage, is used to operate the electrowetting element as a light valve, providing a display effect over the display area 24. For example, switching the fluids to increase adjoinment of the second fluid 12 with the display area 24 may increase the brightness of the display effect provided by the element.

This display effect determines the display state of the electrowetting element which an observer will see when looking towards the viewing side of the display device. The display device is capable of providing display states from black to white, including various intermediate grey states; in a color display device, the display state may also include color.

FIG. 2 shows a plan view of the electrowetting element of FIG. 1. The lateral dimension of the central electrowetting element in FIG. 2 corresponding to the dashed lines 3 and 4 of the electrowetting element 2 in FIG. 1, is indicated by the dashed line 26. Line 27 indicates the inner border of a wall which bounds the surface 14; the line is therefore also the edge, for example a perimeter, of the display area 24. The dashed line 25 marks the boundary between the first fluid 11 and the second fluid 12 when a voltage is applied to the electrowetting element 2 to retract the first fluid 11 against the wall 21 such that the first fluid 11 has the dashed shape 57.

Further details of the fluid motion control structure will now be explained. Reference will be made to FIGS. 3A to 6B and the examples described in relation thereto, but it is to be understood that further examples may include a fluid motion control structure according to examples described herein.

The fluid motion control structure may in examples be considered to comprise at least one of the edge E1 of the first electrode, the electrode free portion and the second dielectric layer 28. The fluid motion control structure aids fluid motion control by determining a location in the electrowetting element where initiation of first fluid motion occurs, when switching from the off state by applying a non-zero voltage of sufficient magnitude. The location for such initiation is determined by a combination of factors, including: fringe field lines of an electric field formed between the second fluid and the first electrode; and a greater capacitance and therefore stronger electric field at a location on the surface over the second dielectric layer compared with a location elsewhere on the surface. The latter of these is due for example to the second dielectric layer being formed of or comprising a dielectric material having a greater dielectric constant value than a dielectric constant value of the first fluid. Hence, there is a greater voltage drop between the first electrode and the second electrode over the second dielectric layer.

For example, the dielectric constant of the first fluid has a relative dielectric constant value of less than 3. Further, the fluid motion structure, for example the second dielectric layer 28 material, has a dielectric constant value which is greater than the dielectric constant value of the first fluid +1 (which may otherwise be notated as eps_x>eps_y+1, where eps_x is for example the dielectric constant of the fluid motion structure or the second dielectric layer 28 material, and eps_y is for example the dielectric constant of the first fluid).

In examples, the second dielectric layer has a thickness such that a second surface portion of the surface 14, which overlaps the second dielectric layer, lies in a second plane which is different from a first plane which a first surface portion of the surface 14 lies in. The first surface portion SP1 overlaps the first electrode, and the second surface portion SP2, and therefore also the second dielectric layer, at least partly overlaps the electrode free portion. The fluid motion control structure may therefore be referred to as an insulated notch. The thickness of the second dielectric layer is such that the height difference between the first and the second planes (and therefore in examples the height of the third surface portion) is for example 25% to 75% of a distance between a surface of the second support plate in contact with the second fluid, and the surface 14 (this distance being taken parallel to the thickness of the second dielectric layer).

Figure 3A:
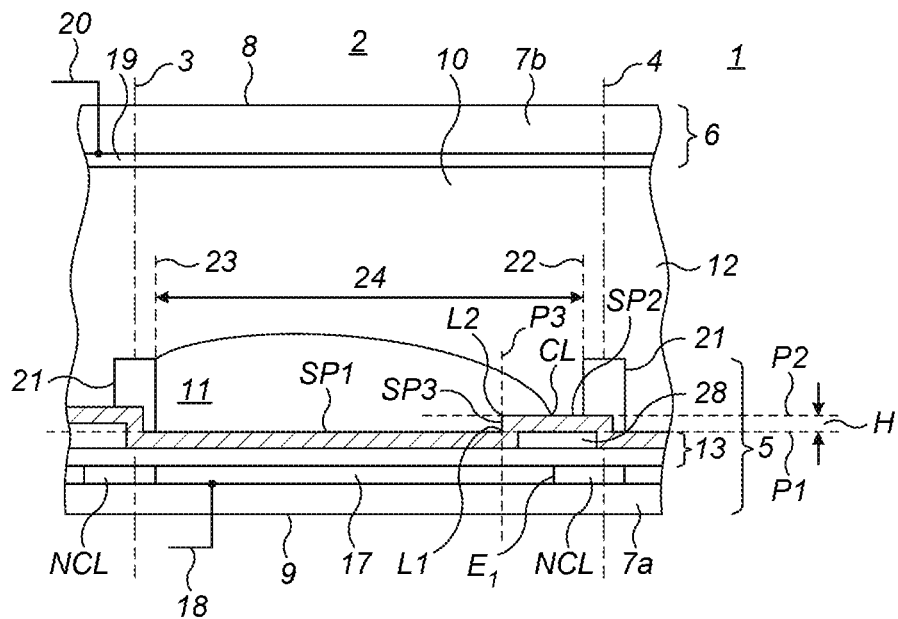
FIGS. 3A, 4A, 5A and 6A, and FIGS. 3B, 4B, 5B and 6B show schematically in cross section and plan view, respectively, different states of the electrowetting element.
Figure 3B:
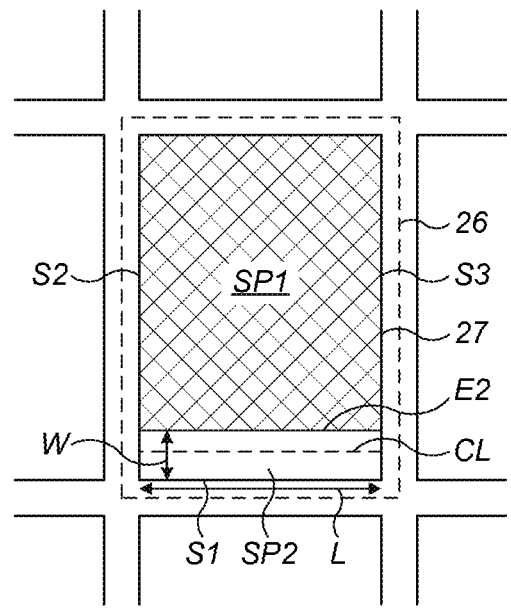

Referring now to FIGS. 3A and 3B, the electrowetting element of FIG. 1 is shown in cross-section and plan view, in a first state. In FIG. 3B, the first surface portion SP1 of the surface 14 is shown with cross-hatched shading. The second surface portion SP2, which is non-overlapping with the first surface portion SP1, is unshaded. In FIG. 3A, the first surface portion SP1 is shown lying in the first plane P1 and the second surface portion SP2 is shown in the second plane P2. In these examples, a third surface portion SP3 of the surface 14 joins the first surface portion SP1 and the second surface portion SP2. The third surface portion SP3 lies in a third plane P3, which is for example substantially perpendicular (within acceptable measuring tolerances) to at least one of the first plane P1 or the second plane P2. Hence, in examples such as those of FIGS. 3A to 6B, the surface may be stepped between the first and second surface portions, with the third surface portion spanning a change in height H between the first surface portion SP1 and the second surface portion SP2. Hence, the second surface portion may be a raised surface portion relative to the first surface portion. The first and second planes may in some examples be substantially parallel to each other (within acceptable measuring tolerances) but separated from each other by a height difference. In other examples the first and second planes may be non-parallel to each other, such that one of the first and second surface portions SP1, SP2 is sloped relative to the other. Hence in some examples, there may not be a third surface portion SP3 as the first and second surface portions may join each other. In other examples, the third surface portion SP3 may be present but may be non-perpendicularly angled relative to for example the first surface portion SP1.

A line L1 is shown in FIG. 3A which corresponds to a join between the first and third surface portions. A line L2 corresponds to a join between the second and third surface portions. Referring now to FIG. 3B, and with the third surface portion SP3 in these examples being substantially perpendicular to the first and second surface portions, each of lines L1, L2 correspond with an edge E2 of the second surface portion SP2.

It is to be appreciated that in the examples shown, the angle between the first and third surface portions, and separately the angle between the second and third surface portions is shown as 90 degrees. However, this is not limiting, and instead of such a 90 degree angle, a transition between either or both of the first plane and the second plane to the third plane respectively may be curved and hence more gradual in angle change.

A height H difference between the first plane and the second plane is indicated. This height may be considered to be a height of the fluid motion control structure.

Separately, viewing FIG. 3B, a lateral extent of the second surface portion SP2 corresponds with a lateral extent of the second dielectric layer. For example, a length L of the second dielectric layer, and therefore a length L of the second surface portion SP2 may correspond to a length of a first side S1 of the surface 14. A width W of the second dielectric layer may extend partially along a second side S2 of the surface 14 and partially along an opposing third side S3 of the surface 14. The width W and length L dimensions are perpendicular each other, and hence a product of those values corresponds to a surface area of the second surface portion SP2. The surface area of the second surface portion SP2 is for example 5% to 25% of the surface area of the display area 24 (which is for example the sum of the surface areas of the first and second surface portions).

The lateral extent of the second dielectric layer is such that it overlaps the edge E1 of the first electrode. The shape of the second dielectric layer and therefore of the second surface portion SP2 may correspond with a shape of the electrode free portion. For example, the second surface portion SP2 and the electrode free portion may both be rectangular. The lateral extent of the second surface portion SP2 may however be greater in width than a corresponding width of the electrode free portion, such that the second dielectric layer overlaps the edge E1 of the second dielectric layer.

Depending on a magnitude of a voltage applied to the first and second electrodes, the electrowetting element is switchable between different states. As mentioned above, FIG. 1 shows an off state, where for example a zero voltage is applied, such that the first fluid forms a layer covering the surface and therefore across the display area.

In contrast, FIG. 3A shows a first state with the first fluid in contact with substantially all (within acceptable tolerances) of the first surface portion SP1, the second fluid in contact with a first part of the second surface portion SP2 and the first fluid in contact with a second part of the second surface portion SP2. The first and second parts of the second surface portion SP2 are non-overlapping and in examples together equal the surface area of the second surface portion SP2. Hence, in the first state, a contact line CL where a surface of the first fluid, the second fluid and the surface 14 of the support plate meet, is located on the second surface portion SP2. This is shown in FIG. 3B with a dashed line CL.

Figure 4A:
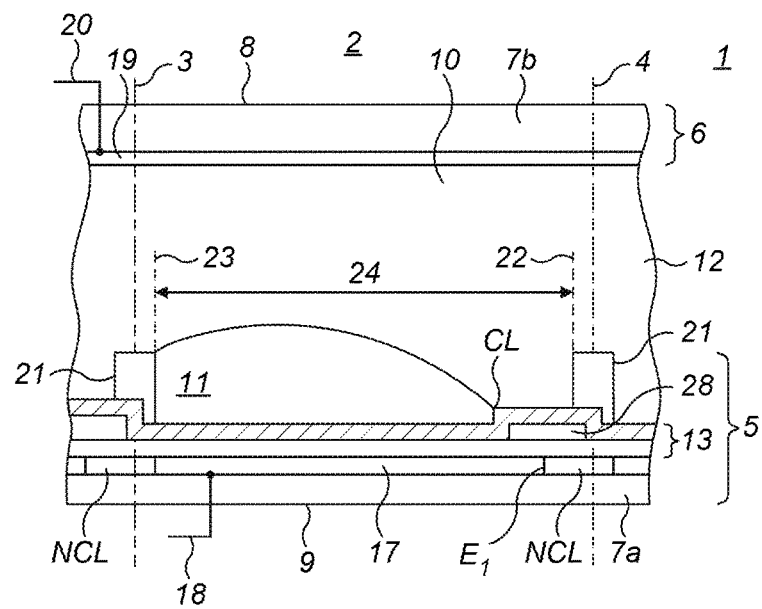
Figure 4B:
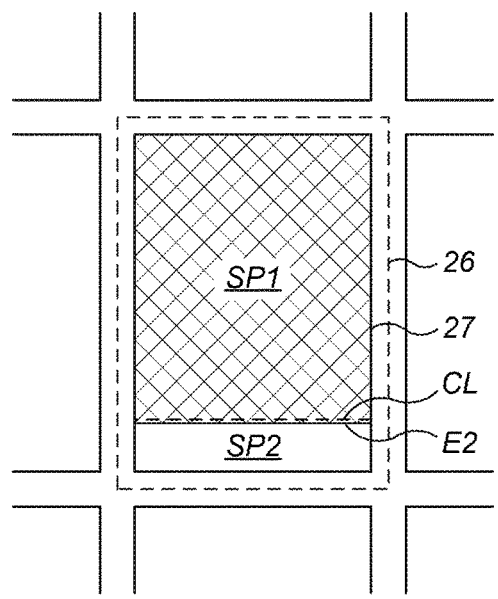

FIG. 4A shows a second state with the first fluid in contact with substantially all of the first surface portion SP1 and the second fluid in contact with substantially all of the second surface portion SP2. The corresponding contact line CL is shown in FIG. 4B. A voltage of greater magnitude than applied for the first state is applied to obtain the second state. In the second state, the contact line CL tends to lie along the second line L2 between the second and third surface portions, rather than along the lower first line L1 between the second and first surface portions, but this is not necessarily the case, and in some examples in the second state the contact line CL may lie along the first line L1.

Figure 5A:
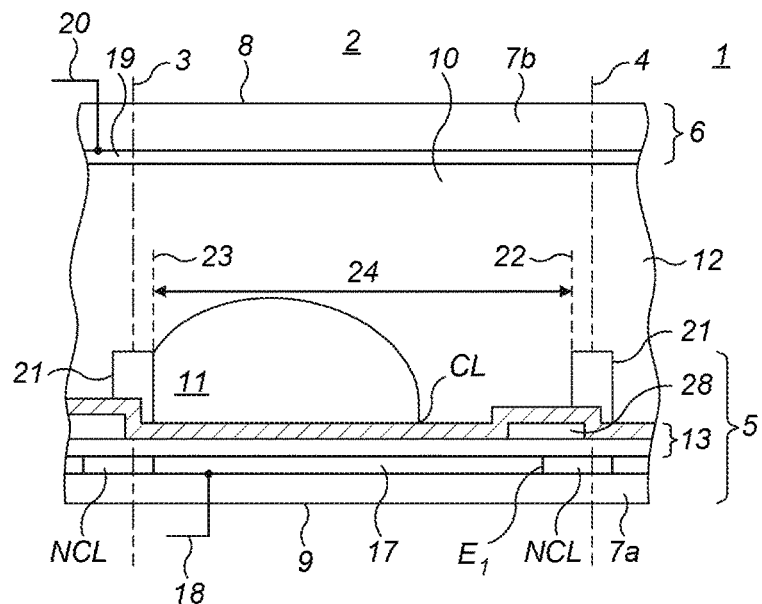
Figure 5B:
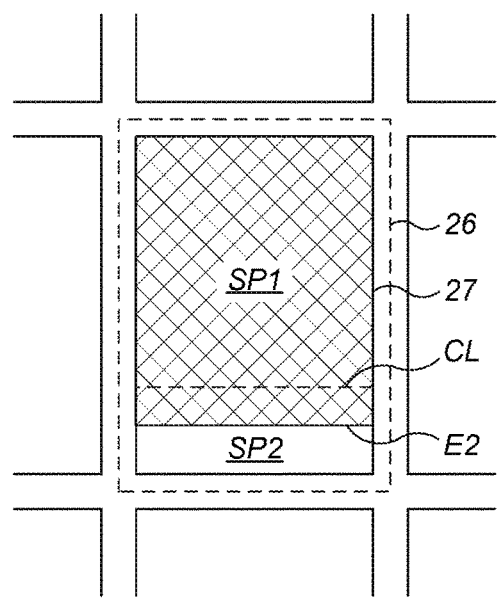

FIG. 5A shows a third state with the first fluid in contact with a first part of the first surface portion SP1, and the second fluid in contact with substantially all of the second surface portion SP2 and a second part of the first surface portion SP1. The first and second parts of the first surface portion SP1 are non-overlapping. FIG. 5B shows the position of the contact line CL. In the third state the first fluid is more retracted than the second state, with a voltage of greater magnitude than as applied in the second state.

Figure 6A:
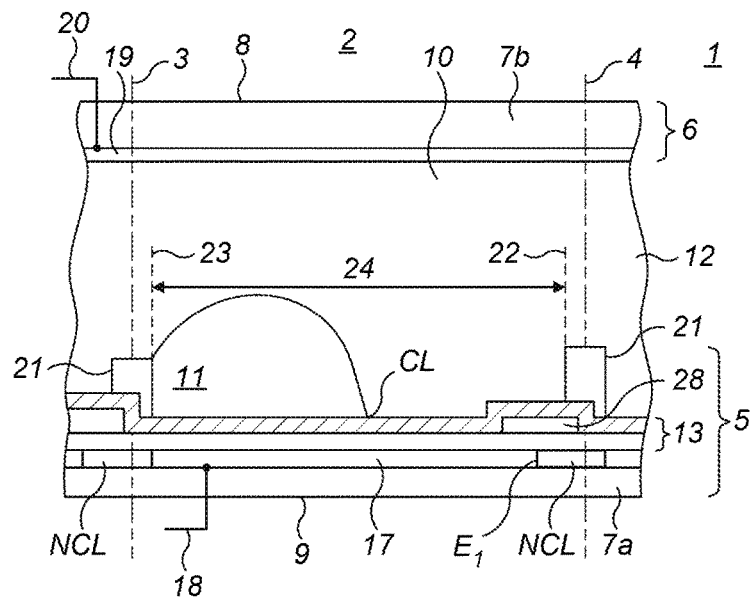
Figure 6B:
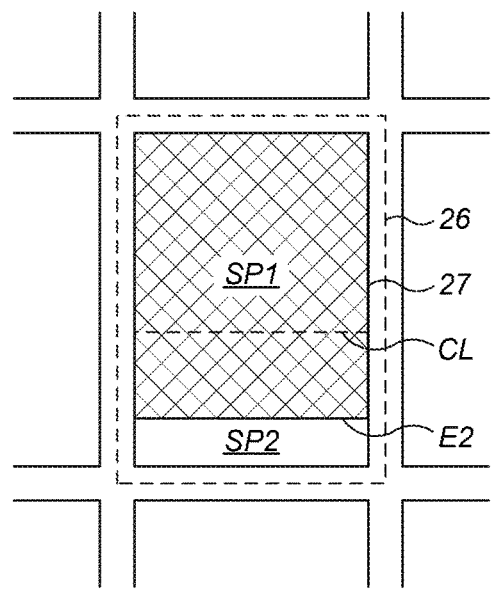

FIG. 6A shows a fourth state, otherwise referred to as state b), with the first fluid in contact with a first part of the first surface portion SP1 in contact with the first fluid, the first part smaller than the first part of the first surface portion SP1 in the third state. The state b) may have a darker greyscale level than the second state described later. Further, the second fluid contacts substantially all of the second surface portion and a second part of the first surface portion SP1, the second part larger than the second part of the first surface portion in the third state. Hence, in the fourth state, the first fluid is more retracted than in the third state, with a voltage of greater magnitude than as applied in the third state. FIG. 6B shows the position of the contact line CL.

Examples have been described with the second dielectric layer and therefore the second surface portion SP2 having a rectangular lateral extent. In other examples, such as those now to be described, the second dielectric layer and therefore the second surface portion SP2 may have different dimensions, and/or extent than described previously. This may influence the functionality of the fluid motion control structure, for example a location where initiation of fluid first motion occurs.

Figure 7:
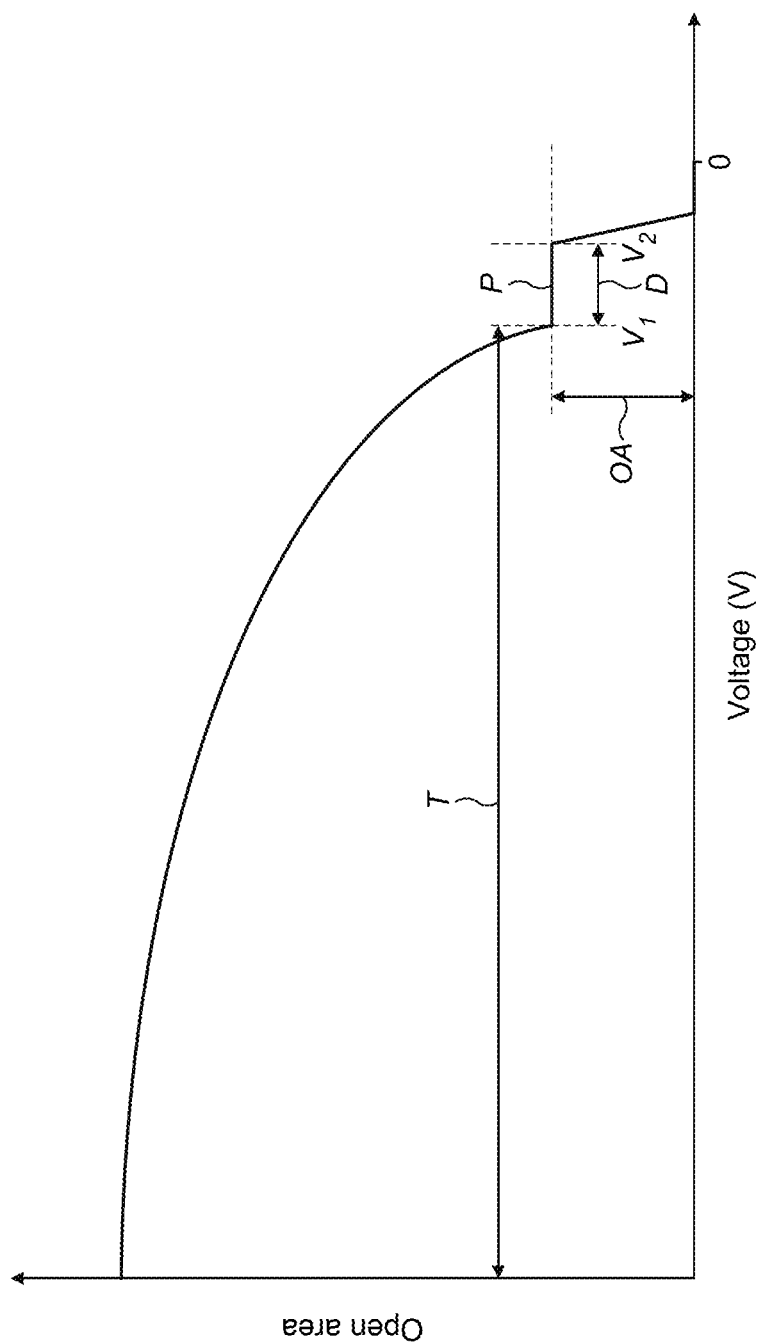
FIG. 7 shows a plot of an open area against voltage.

An explanation of changing a configuration of the fluids in an electrowetting element according to examples described herein will now be given. FIG. 7 will be referred to, which shows a plot of a voltage (V) on the horizontal axis and a so-called open area amount on the vertical axis. The open area amount may be considered to be an arbitrary unit, corresponding to the proportion of the surface which is contacted by the second fluid. Thus, for a greater value of the open area, the more retracted the first fluid is, and therefore the greater the amount of surface is contacted by the second fluid; hence the open area may be considered a measure of how open the light valve of the electrowetting element is.

It is to be noted that FIG. 7 shows the relationship between the open area and applied voltage as the electrowetting element is closed from a retracted configuration of the first fluid to the off state with the first fluid as a layer covering the surface. Hence, starting from a state with the first fluid retracted, on the left most side of the plot, and with the largest magnitude of voltage value applied (which voltage value may be positive or negative), and decreasing the applied voltage, the size of the open area decreases correspondingly.

As can be seen in the plot, there is a plateau P between a first voltage value V1 and a second voltage value V2. The plateau corresponds to a constant open area for a decreasing voltage value. Hence, the plateau represents a more stable fluid configuration, and thus open area, than other fluid configurations where a change in voltage value has a corresponding change in open area. This more stable fluid configuration is the second state of the electrowetting element described earlier. Thus, the plateau corresponds to a range of a plurality of voltage values, all of which may be different, at which the electrowetting element is in the second state. The first voltage value V1 corresponds to a first voltage value threshold for switching the electrowetting element from the third state to the second state. The second voltage value V2 corresponds to a second voltage value threshold for switching the electrowetting element from the second state to the first state. As the plot shows, the first and second voltage value thresholds are different from each other. Hence, in examples, the first voltage value threshold is substantially (within appropriate measuring tolerances) a maximum voltage value, and the second voltage value threshold is substantially (within appropriate measuring tolerances) a minimum voltage value of a voltage value range of the applied voltage for switching the electrowetting element to the second state from the third state.

Thus, based on display effect data indicative of a requested display effect for display by the electrowetting element, a voltage value may be determined for a voltage to apply to the first and second electrodes, the voltage value being within the range of the plurality of voltage values.

For a voltage value greater in magnitude than the maximum voltage value, the electrowetting element is switchable to the third or fourth state described above, and for a voltage value lower in magnitude than the minimum voltage value, the electrowetting element is switchable to the first state or off state described above.

The plateau is a consequence of the fluid motion control structure. Certain properties of the plateau depend on the construction of the fluid motion control structure.

For example, the position of the first voltage value threshold may correspond to the size or magnitude of the surface area of the first surface portion SP1. Thus, the magnitude of the surface area of the first surface portion may determine the maximum voltage value of the range of the plurality of voltage values. Thus, for a larger first surface portion, the voltage value corresponding to the first voltage value threshold may be lower.

In some examples, with the third surface portion joining the first and second surface portions, a location of the third surface portion within the electrowetting element corresponds to, for example determines, the maximum voltage value of the range of the plurality of voltage values. Hence, the position and/or dimensions of the fluid motion control structure, and hence the position of the third surface portion, which in examples provides the step between the first and second surface portions, corresponds to the voltage value where the third state switches to the second state, and therefore the first voltage value threshold. Thus, for example, the width W of the second surface portion corresponds to the open area value for the plateau and therefore for the second state.

In other examples, a difference D between maximum and minimum voltage values of the range of the plurality of voltage values corresponds to, for example is determined by, the height H of the third surface portion between for example the first and second planes of respectively the first and second surface portions. The height H in examples depends on the thickness of the second dielectric layer, the thickness taken in a direction perpendicular the first plane, for example. The greater the height H, the greater the difference D. This is for example due to the increased energy required for the first fluid and specifically the contact line CL to overcome the height difference between the first and second planes so as to contact the second surface portion. In other words the height H can be considered to represent a physical barrier for the first fluid to switch from the second state to the first state.

In further examples, a dielectric constant of the dielectric material which the second dielectric layer comprises or is formed of corresponds to, for example determines, the difference D between the maximum and minimum voltage values. This can be understood in that for a higher dielectric constant material, a stronger capacitance may be obtained, and hence a stronger electric field. This resists switching of the first fluid from the second state to the first state for longer, and hence increases the difference D.

In some examples, a volume of the first fluid corresponds to, for example determines, the maximum voltage value of the range of the plurality of the voltage values. The volume is related to a thickness of the first fluid, including a first thickness T1 of the first fluid taken away from the second dielectric layer, and a second thickness T2 of the first fluid taken over the second dielectric layer. Both the first and second thicknesses T1, T2 are shown in FIG. 1 and are in a direction perpendicular to the second plane, with the electrowetting element in the off state. As the capacitance of the electrowetting element depends on the position of the first fluid surface which interfaces with the second fluid, a thickness of the first fluid influences the capacitance strength of the electrowetting element, and hence the first voltage value threshold, as indicated in FIG. 7 by arrow T.

As noted above, FIG. 7 shows the change in open area against voltage, when closing the electrowetting element.

The same plot does not necessarily apply for opening the electrowetting element, for example when switching from the off state to for example a state between the fourth state and the second state. This is due to hysteresis effects. For example, when switching from the off state, surface tension forces with the wall need to be overcome, which can require so-called overdriving of the electrowetting element, where a greater voltage value is applied to initiate movement of the first fluid and in doing so overcome the surface tension forces. Once the first fluid is initiated, then it is possible to obtain a more closed state again, with a correspondingly lower grey-scale value, by decreasing the voltage value. Such a more closed state may not be obtainable directly from the off state, due to the need to first overdrive the element to overcome the hysteresis effect. At a certain voltage value, the electrowetting element tends to switch to the off state, even if a non-zero voltage is applied. This again is due to favourable surface tension forces of the first fluid in contact with the wall.

In known electrowetting elements, a fluid motion control structure is not used which provides a plateau in an open area against voltage plot such as FIG. 7. Hence, low grey-scale values are difficult to achieve, as when opening the element an overdrive voltage needs to be applied from the off state, and when closing the element, certain states where the voltage is too low (and the grey-scale state is correspondingly low), the first fluid tends to switch back to the off state despite a non-zero voltage being applied.

Hence, by incorporating a fluid motion control structure in an electrowetting element, in accordance with examples described above, designed to provide a plateau in the open area against voltage plot, more stable low grey-scale levels can be obtained. Typically, a grey-scale level corresponds to a level of lightness of a display effect, for example on a scale between a darkest obtainable display effect (e.g. black), and a lightest obtainable display effect (e.g. white).

This is due to the presence of the second state being available due to the provision of the appropriately configured fluid motion control structure. Compared with known electrowetting elements, the availability of the second state of present examples offers a stable intermediate state between the fourth state and the off state, and hence a stable lower level grey-scale level.

Examples will now be described which use the second state to improve a display effect provided by an electrowetting element, with reference to FIG. 8.

In such examples, a method of controlling an electrowetting element such as one described earlier, comprises receiving (by for example a display driving system) display effect data representing a requested display effect, with for example a requested greyscale level, and which may correspond to a first state of the electrowetting element with the first fluid at least partly contacting the first surface portion and the second fluid at least partly contacting the second surface portion. Such a first state is for example the first state described earlier using FIG. 3A. Based on the requested display effect, it may be determined to switch the electrowetting element to the second state instead of the first state. Such a determination may be made for example by a display controller, for example using a look up table where for a given display effect to be displayed, one of the off state, the second state or the fourth state is selected instead. The second state or fourth state may be considered to be available display effects, available for the electrowetting element to be switched to, where other display effects, for example certain requested display effects, are unavailable; for example in the programming of control software or configuration of control circuitry, they are selected to be unavailable due to their instability.

Determining to switch the electrowetting element to the second state instead of the third state, for example, is done to obtain a more stable grey-scale level. As explained above, the first state may be unstable, due for example to surface tension forces which may tend to close the electrowetting element to the off state. Hence, by providing the fluid motion control structure, and as a consequence the availability of the second state, a more stable intermediate grey-scale level can be provided between the fourth state and the off state. Thus, responsive to display effect data corresponding to the first or third state for example, the electrowetting element may instead be switched to the second state. To do this, a value of a voltage to be applied to the first and second electrodes for switching the electrowetting element to the second state is determined for example using a controller. Then, the voltage with the value is generated which voltage with the voltage value is then output, so as to be applied to the first and the second electrode.

The determining in examples may including determining not to switch the electrowetting element to the off state, on the basis of the display effect data. In this way, there may be a choice in response to the display effect data to switch the electrowetting element to the off or second state. In selecting the second state, it is determined not to switch to the off state.

In some examples, the method comprises comparing a value of the voltage which corresponds to the first state respectively with at least one of the voltage value for the second state, a voltage value corresponding to the off state, or a voltage value corresponding to the fourth state. The determining to switch the electrowetting element may be based on this comparing. In some examples, the comparing comprises calculating respectively a first difference between the value for the first state and the value for the second state, and at least one of a second difference between the value for the first state and the value for the third state, or a third difference between the value for the first state and the value for the fourth state. It may then be determined that the first difference is less than at least one of the second difference or the third difference. On the basis of this identifying that the value for the second state is closest to the first state, the determining to switch the electrowetting element to the second state may be made.

Using such methods, where input display effect data indicates a requested display effect, which corresponds with a state of the electrowetting element with an unstable fluid configuration, it may instead determine which of the more stable off state, second state or fourth state is nearest to the desired or requested state, and then switching the electrowetting element to that state.

The state which the electrowetting element is switched to depends on the display effect requested by the display effect data which is received. Typically, a requested display effect is a display effect indicated by or encoded in input display effect data, but which may or may not be displayable by the electrowetting element, depending on its configuration. For example, as explained elsewhere, some display effects may be unavailable, as they would require an electrowetting state (and a corresponding fluid configuration) which is unstable. Hence, for requested display effects which are unavailable, an available display effect for the electrowetting element is selected instead. In some examples, the electrowetting element can be switched to a plurality of different fluid configurations, to give a range of display effects from a lightest display effect to a darkest display effect, but some of which are more stable than others. In examples, the range of display effects may have at least two sub-ranges; a first sub-range for lighter display effects, with the first fluid more retracted, which fluid configurations are generally stable, and which are therefore available for switching the electrowetting element to; and a second sub-range for darker display effects, with the first fluid less retracted, which fluid configurations are generally unstable except for certain predetermined fluid configurations (which for example correspond with the off state, the second state and the fourth state). Hence, for a requested display effect which lies in the first sub-range, the electrowetting element may be switched to a corresponding state and fluid configuration to provide the requested display effect. But, for a requested display effect which lies in the second sub-range, the requested display effect may correspond with an available state (for example a predetermined stable state), and the electrowetting element may be switched to a fluid configuration and state corresponding to that display effect. However, if a requested display effect in the second sub-range is unavailable, the electrowetting element may be switched to an available state instead. Examples will now be elaborated on.

For example, with reference to FIG. 8, a method comprises receiving first display effect data which is indicative of a first requested display effect for display by the electrowetting element. Based on the first display effect data, a voltage value is determined to apply to the first and second electrodes, a voltage with the voltage value is then generated and outputted, for example by a display driver, to be applied to the first and second electrodes, so as to switch the electrowetting element to the second state described above. Then, second display effect data is received, which is indicative of a second requested display effect, different from the first requested display effect. Based on the second display effect data, a voltage value is determined of a voltage to apply to the first and second electrodes of the electrowetting element. Such a voltage is generated and then output so as to be applied to the first and second electrodes, to switch the electrowetting element to the second state. Thus, although the first and second requested display effects are different, for each requested display effect the voltage value is determined to switch the electrowetting element to the same state, namely the second state, in response to each of the first and second display effect data. This is for example due to at least one of the requested first and second display effects corresponding to an unstable fluid configuration. Thus, the second state, being an available display effect, is selected for switching the electrowetting element to instead, due to its greater stability.

To determine the voltage value, based on the first display effect data, the method may comprise comparing the first requested display effect with a first available display effect and a second available display effect for the electrowetting element, with the first available display effect corresponding to the first requested display effect. For such a comparison, data indicative of the first and second available display effects may be processed with the first display effect data. With the first available display effect corresponding to the first requested display effect, from the comparison it may be determined that the first requested display effect is substantially equal (within acceptable comparison errors) to the first available display effect, and thus the voltage value may be set so that the electrowetting element is switched to the first available display effect in response to the first display effect data.

In contrast, to determine the voltage value, based on the second display effect data, the method may comprise comparing the second requested display effect with the first and second available display effects, with the first available display effect corresponding to the first requested display effect. Such a comparison may be similar to that described above, using data indicative of the first and second available display effects. From the comparison, it may be determined that the second requested display effect is different from the first available display effect and the second available display effect. On this basis, the voltage value may then be set to switch the electrowetting element to a state corresponding with one of the first and second available display effects, instead of the requested second display effect. For example, the method may include calculating a first difference between the second requested display effect and the first available display effect, calculating a second difference between the second requested display effect and the second available display effect, and determining that the first difference is less than the second difference. Such differences may represent a difference in greyscale level, or magnitude of brightness between the two display effects related by the difference. The voltage value is then for example determined on the basis of the smaller difference, in other words in this example with the second requested display effect being closer in greyscale level to the first available display effect than the second available display effect. Thus, the electrowetting element is switched to the second state on the basis of the first difference being smaller than the second difference. With the first available display effect corresponding to the second state, the second available display effect may correspond to one of the off state or the fourth state.

Dithering is a technique known in the art to compensate for poor stability of low grey-scale levels. For example, in an electrowetting element without the fluid motion control structure, and therefore without the second state, for an array of electrowetting elements to display a low grey-scale level, a selection of elements in the array may be switched to the off state, and the other elements in the array may be switched to the fourth state, as the off state and the fourth state are each sufficiently stable. Hence, through averaging by the human eye, for an appropriate spatial pattern for the elements in the off and fourth states, and for example assisted by diffusion effects, a low grey-scale level may be displayed using a combination of the off and fourth states. Use of these states may be referred to as quantisation, with the off and fourth states each representing stable quantisation levels for use in dithering.

In accordance with examples of the electrowetting element described herein, the provision of the second state, designed with an appropriately selected open area value and plateau properties, provides an extra quantisation level for use in dithering. The second state may be designed to have an open area value approximately midway in greyscale level between the off state and the fourth state. Now, low greyscale levels can be represented using a combination of three grey-scale levels, namely the fourth, second and off states. Hence, with appropriate selection of the elements for switching respectively to the fourth, second and off states, and with an appropriate spatial distribution, a low grey-scale level may be displayable despite that low grey-scale level corresponding with for example a less stable third or first state. Hence, improved low grey-scale levels are displayable compared with known systems.

Figure 10:
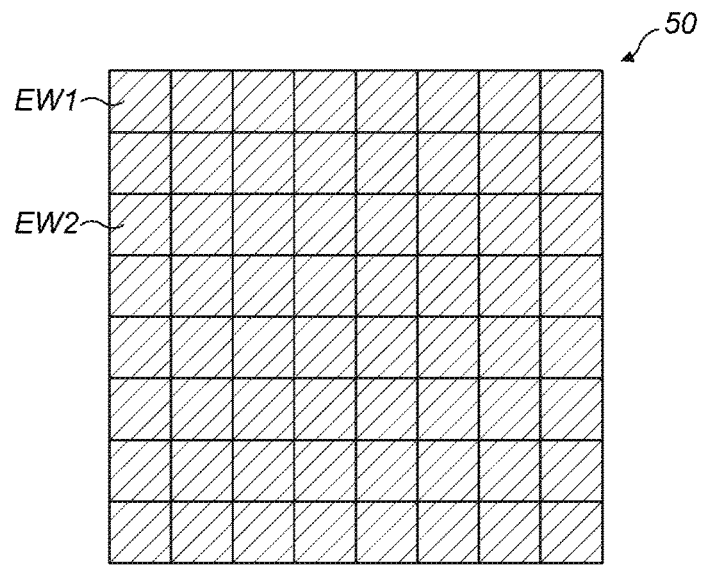
FIGS. 10 and 11 show schematically dithering of examples.
Figure 11:
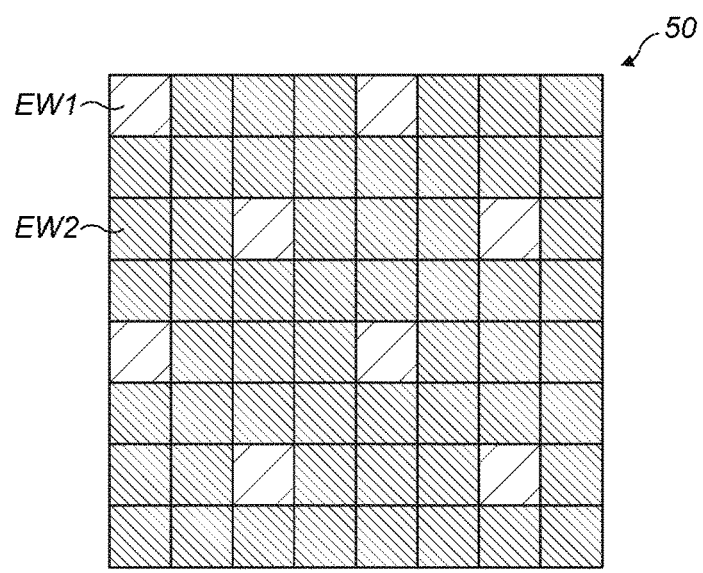

In examples, and in accordance with FIG. 9, and as explained further using FIGS. 10 and 11, dithering may be applied on display effect data, which is for example part of image data. The image data and/or display effect data is for example received by the at least one processor. The image data represents a display effect for each of a sub-set of electrowetting elements, or each respective electrowetting element, of the array of electrowetting elements. So, the image data represents at least a requested display effect for respectively a first electrowetting element and a second electrowetting element of the array of electrowetting elements. Each of the first and second electrowetting elements is for example in accordance with an example of the electrowetting element described above. Such a requested display effect for example corresponds with the first state or the third state described above. It is noted that in some examples, a second electrode of more than one electrowetting element of the array (for example the first and the second electrowetting elements) are formed together as a single electrode, and that the second fluid of each of those electrowetting elements may be shared. Hence, one second electrode may act as the second electrode for each of a plurality of electrowetting elements of the array.

In such examples, and based on the display effect, it is then determined to switch the first electrowetting element to the state a) or b), instead of the requested display effect. A first voltage value is determined for such switching and the voltage is generated and applied to the first and second electrodes of the first electrowetting element.

For the second electrowetting element, and based on the display effect data indicative of the requested display effect, a second voltage value is determined, generated and applied to the first and second electrodes of the second electrowetting element, to switch the second electrowetting element to the second state.

In examples, the determining the first voltage value and the second voltage value is respectively based on comparing the requested display effect with a first available display effect and a second available display effect for each of the first and second electrowetting elements. Based on that comparison, it is determined that the requested display effect is between, the first and second available display effects. Therefore, for example, the requested display effect is different from the first and second available display effects, which indicates that dithering is to be used. Depending on the greyscale level of the requested display effect, the first available display effect in some examples corresponds to the state a), and in other examples the first available display effect corresponds to the state b). The second available display effect in such examples corresponds to the second state with the first fluid contacting substantially all of the first surface portion and the second fluid contacting substantially all of the second surface portion. These available states may be within the second sub-range described previously.

Hence, depending on the display effect data, and for example a requested grey-scale level for each of the sub-set of, or each, electrowetting element(s) of the array to display, as coded by the display effect data, it can be determined whether dithering using the fourth state and the second state is used, or whether dithering using the second state and the off state is used. In the former, the requested grey-scale level may correspond to the third state, and in the latter, the requested grey-scale level may correspond to the first state with the first fluid contacting substantially all of the first surface portion.

FIGS. 10 and 11 illustrate such an example further, where the image data represents a grey-scale level for each of a sub-set 50 of electrowetting elements of the array, as shown in FIG. 10. The grey-scale level corresponds to a requested display effect, which for example corresponds to the first state. As this requested display effect is unstable, and is therefore unavailable for switching, a dithering technique is used where, depending on a position of each electrowetting element in the array, each electrowetting element is switched to a stable state, for example the second state or the off state. So, the determining of the first and second voltage values for the first and second electrowetting elements respectively is based on the position of the first and second electrowetting elements in the array, and/or relative to each other. For example, the first electrowetting element EW1 may be switched to the second state based on its position, and the second electrowetting element EW2 may be switched to the off state, as shown in FIG. 11.

Depending on the specific greyscale level represented by the image data, a particular spatial pattern of a first group of electrowetting elements (including the first electrowetting element) of the array is determined and used to select electrowetting elements to be switched to the state a) or b). Similarly, a particular spatial pattern of a second group of electrowetting elements (including the second electrowetting element) of the array is determined and used to select other electrowetting elements to be switched to the second state. The particular spatial patterns used for respectively the first and second groups depends on the grey-scale level to be approximated for a viewer. For example, for a lighter grey-scale level, more electrowetting elements may be switched to the second state, with fewer electrowetting elements switched to the off state. In other examples, for a darker grey-scale level, the opposite applies. The spatial pattern may not only specify a required density of electrowetting elements to have one of the second or off state, but may also specify the pattern that those second state and/or off state switched electrowetting elements are arranged according to.

FIG. 11 illustrates a first such spatial pattern of a first group of electrowetting elements switched to the second state. The first group includes the first electrowetting element EW1 and further electrowetting elements switched to the same state. FIG. 11 illustrates also a second such spatial pattern of a second group of electrowetting elements switched to the off state. The second group includes the second electrowetting element EW2 and further electrowetting elements switched to the same state (shown in black in FIG. 11).

A similar approach using first and second spatial patterns applies in further examples where the first group is switched to the second state and the second group is switched to the fourth state.

In determining a respective spatial pattern to use for the first group and the second group of electrowetting elements, in some examples the density and/or pattern of arranging those electrowetting elements may be calculated using an appropriate algorithm, based on the grey-scale level represent by the first image data, and for example the number of electrowetting elements to which that grey-scale level applies to. In other examples, for a given grey-scale level represented by the first image data, data representing a predetermined spatial pattern for a given grey-scale level may be retrieved for example from a memory, and used to determine the first group of electrowetting elements and the second group of electrowetting elements.

In examples, the image data is indicative of a requested grey-scale level for display by at least some (e.g. the sub-set of) the array of electrowetting elements, with the grey-scale level being less than a grey-scale level threshold. This grey-scale level threshold may correspond with the fourth state. Hence, for a darker grey-scale level than the fourth state, a dithering technique may be applied, in accordance with examples described above, given the relative instability of some fluid configurations other than the off state and the second state. However, where the image data corresponds to a requested grey-scale level corresponding to the fourth state, or a lighter grey-scale level, dithering may not be applied, as for grey-scale levels corresponding to the fourth state and lighter, the electrowetting element can be switched to an appropriate fluid configuration which is stable. In this way, it may be considered that for grey-scale levels darker than the fourth state, a dithering technique is used with quantised grey-scale levels (e.g. the second state and the off state and the fourth state), whereas for grey-scale levels lighter than the fourth state, no dithering is required, and what may be considered to be an analog driving of an electrowetting element can be used.

It is noted that in such examples, when switching an electrowetting element from the first state to the second state, it may be necessary to apply a greater magnitude of voltage first than required, then to decrease the magnitude to that for obtaining the second state. This so-called overdriving of the electrowetting element may be required to overcome hysteresis effects. In doing so, the greater magnitude is selected to be between a magnitude of a voltage value between that of the fourth state and the second state, and such that the first fluid is not retracted sufficiently such that the electrowetting element instead tends to switch to the stable fourth state instead of the second state. Similarly, when switching from for example a lighter grey-scale level than the fourth state to the second state, the magnitude of the voltage value is selected so that the first fluid does not tend to close beyond needed, as otherwise the stable off state may instead be obtained. Selecting the appropriate voltage value is based on for example using a difference between consecutive display effects of the electrowetting element, and determining an appropriate change in voltage value based on that difference.

Figure 12:
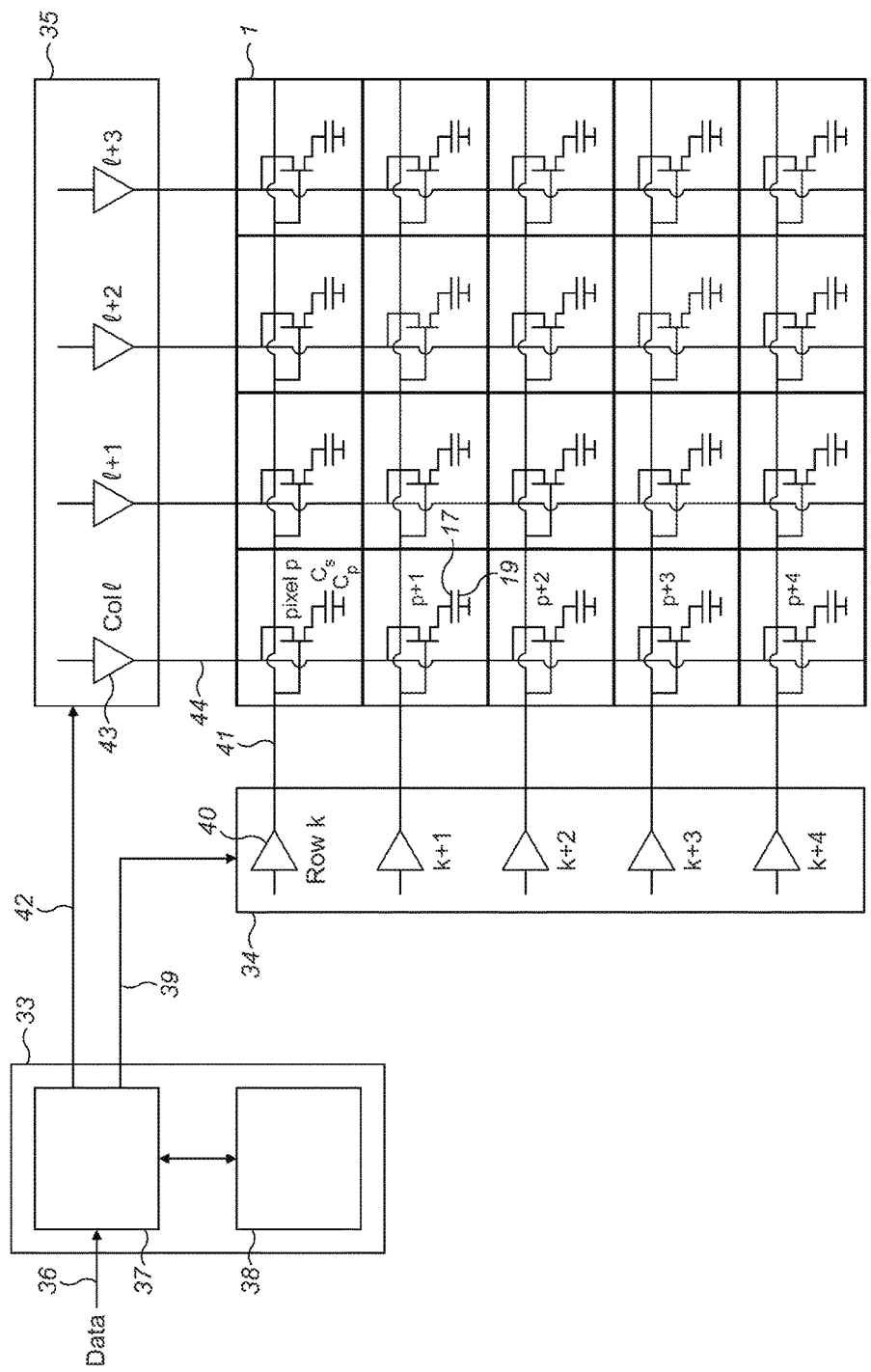
FIG. 12 shows schematically circuitry for driving a matrix of electrowetting elements.

FIG. 12 shows schematically circuitry for driving a so-called active matrix drive type display apparatus. The apparatus includes a display driving system and an electrowetting display device 1, which is for example similar to or the same as the electrowetting display device 1 described above with reference to FIG. 1; a corresponding description applies. The display driving system is for example part of a display device control subsystem described later and in this example includes a display controller or controller 33, a display row driver 34 and a display column driver 35. Data indicative of display states of the electrowetting elements, the display states for example representing a still image or video images, is received via an input line 36 to the display driving system. The display controller includes at least one processor 37 for processing the data entered via the input line 36. The processor is connected to at least one memory 38. The display controller prepares the data for use in the display device.

The at least one memory may store computer program instructions that are configured to cause the display apparatus to perform one or more of the methods of controlling a display device as described when being executed by the processor. The computer program instructions may be stored on a computer program product including a non-transitory computer-readable storage medium. Details of the at least one processor and the at least one memory are described further below with reference to FIG. 13.

An output of the processor 37 is connected by line 39 to the display row driver 34, which includes row driver stages 40 that transform signals to the appropriate voltages for the display device 1. Row lines 41 connect the row driver stages to respective rows of the display device 1 for transmitting the voltage pulses generated in the display row driver to electrowetting elements in each row of the display device, thereby providing a row addressing signal to each row of the display device. In other words, one or more voltage pulses for addressing one or more rows is transmitted over the row lines 41 corresponding to the rows to switching elements corresponding respectively to the electrowetting elements in the one or more rows. The display row driver 34 generates the voltage pulses used for addressing the rows of the display device, using information from the processor 37 to set a value of the pulse duration of the voltage pulses.

Another output of the processor 37 is connected by line 42 to the display column driver 35, which includes column driver stages 43 that transform signals to the appropriate voltages for the display device 1. Column lines 44 connect the column driver stages to the columns of the display device 1, providing a column signal to each column of the display device.

The display controller 33 determines which rows are selected for addressing and in which order. The selected rows are consecutively addressed by applying an addressing signal to each of these rows. The addressing may include the steps of determining a value for a first pulse duration corresponding to at least one voltage pulse to be applied to a row of electrowetting elements, generating the at least one voltage pulse having the first pulse duration and transmitting the at least one voltage pulse to the rows to be addressed. In examples where the electrowetting elements of a row are connected to the same row line, addressing a row for example refers to addressing one or more, for example each, electrowetting element of that row. When an electrowetting element is being addressed, the electrowetting element admits the column signal that is applied to the column line to which the electrowetting element is connected. The column signal for an electrowetting element is applied substantially simultaneously with the voltage pulse used for addressing the electrowetting element. The column signal may be considered to be applied substantially simultaneously with the voltage pulse for example where the column signal is present on the column line for at least the pulse duration of the voltage pulse.

In other examples, a column addressing signal may be applied to one or more, for example, each column of the display device to admit a signal level of a row signal to the electrowetting element electrode. In other words, the functions of the display row driver and display column driver may be swapped, with the display column driver used to generate a voltage pulse for addressing columns of the display device, for example to switch a transistor of each of the electrowetting elements of the column to a conducting state to pass the signal level of the display row driver to the electrowetting element electrode to set the corresponding electrowetting element in a desired display state.

The display drivers may comprise a distributor, not shown in FIG. 12, for distributing data input to the display driver over a plurality of outputs connected to the driver stages. The distributor may be a shift register. FIG. 12 shows the lines only for those columns and rows of the display device that are shown in the Figure. The display row drivers may be integrated in a single integrated circuit. Similarly, the display column drivers may be integrated in a single integrated circuit. The integrated circuit may include the complete driver assembly. The integrated circuit in examples, such as that of FIG. 12, is integrated on the first support plate, although in other examples the integrated circuit may be integrated on the second support plate instead. The integrated circuit may include the entire display driving system. Such an arrangement may be known as a "chip on glass" (COG) construction. In other examples a "chip on foil" (COF) construction may be used, where the display column drivers and/or display row drivers may be integrated on a foil, which is then arranged on the first or second support plate, which foil is connectable to circuit lines of the first or second support plate for driving the picture elements. The integrated circuit may include part or the entire display device control subsystem.

The display device 1 comprises a plurality of electrowetting elements arranged in a matrix or array of n rows, where n may be ≥2, for example larger than one. The matrix may have an active matrix configuration. The matrix may have m columns, where m may be ≥2; the total number of electrowetting elements in this example is n×m. FIG. 12 shows electrowetting elements for five rows, labelled k to k+4 and four columns labelled l to l+3. The total number of rows and columns for common display devices may range between a few hundred and a few thousand. The electrowetting elements of column l are labelled p to p+4. Each electrowetting element may have the same construction as the electrowetting element 2 in FIG. 1.

As noted above, FIG. 12 shows a few electrical parts of the electrowetting elements. Each electrowetting element of the display device 1 includes an active element in the form of one or more switching elements. The switching element may be a transistor, for example a thin-film transistor (TFT), or a diode. The electrodes of the electrowetting element are indicated as an electrowetting element capacitor Cp formed by the electrowetting element electrode 17 and the second electrode 19. The electrowetting element may include a storage capacitor Cs for storage purposes or for making the duration of the holding state or the voltage applied to the element uniform across the display device. The storage capacitor Cs is arranged in parallel with Cp and is not separately shown in FIG. 12

As explained above, in examples, the display column driver 35 provides the signal levels corresponding to the input data for the electrowetting elements. The display row driver 34 provides the signals for addressing the row of which the electrowetting elements are to be set in a specific display state. In examples, addressing a row for example refers to applying a signal on the signal line of the row that switches a transistor of each of the electrowetting elements of the row to a conducting state of the transistor. Each row of the n rows of the display device is addressable by a signal such as a voltage pulse; the voltage pulse is applied to a switching element of each of the electrowetting elements in the addressed row for switching the switching element.

The addressing of rows is part of the addressing of electrowetting elements in an active matrix display device. A specific electrowetting element is addressed by applying a voltage to the column in which the specific electrowetting element is located and applying a voltage pulse to the row in which the specific electrowetting element is located.

When the transistor of an electrowetting element receives at its gate a voltage pulse of its row addressing signal, the transistor becomes conducting and it passes the signal level of its display column driver to the electrowetting element electrode 17 of the electrowetting element, and to the second plate of the storage capacitor Cs in examples with a storage capacitor Cs. In examples, a voltage pulse is a rapid, transient change in the voltage from a baseline value to a higher or lower value, followed by a rapid return or change to the baseline value. The time period between the two subsequent voltage changes of the voltage pulse is called a pulse duration. After the transistor has been switched off, so the transistor is no longer conducting, the voltage over the cell will be substantially maintained until the transistor is switched on again by the next row addressing signal for the electrowetting element. The time during which the transistor is switched off may be referred to in examples as the holding state of the element. In this active matrix driving method the electrodes of the electrowetting elements are connected to the driver stages briefly at the start of a period during which they show a certain display effect. During this connection, a voltage related to the desired display effect is applied between the electrowetting element electrode and the second electrode. After the electrowetting element is disconnected from the driver stage, the voltage between the electrowetting element electrode and the second electrode is substantially maintained by one or more capacitors during the period during which the electrowetting element shows the display effect, for example by the electrowetting element capacitor Cp and by the storage capacitor Cs. The period during which the voltage is substantially maintained is determined in these examples by the combined capacitance and leakage currents of the two capacitors Cp, Cs. By using a storage capacitor Cs as well as the electrowetting element capacitor Cp, the voltage may be substantially maintained for a longer duration than otherwise, although in other examples the electrowetting element need not include a storage capacitor Cs. A voltage may be considered to be substantially maintained for example where a change in the voltage is sufficiently small that it does not cause a visible change in a display state of an electrowetting element. For example, a change in display effect, for example transmission or reflectance, of less than 10% is typically not visible to a viewer. The method is called 'active', because the electrowetting element contains at least one active element, for example a transistor.

Figure 13:
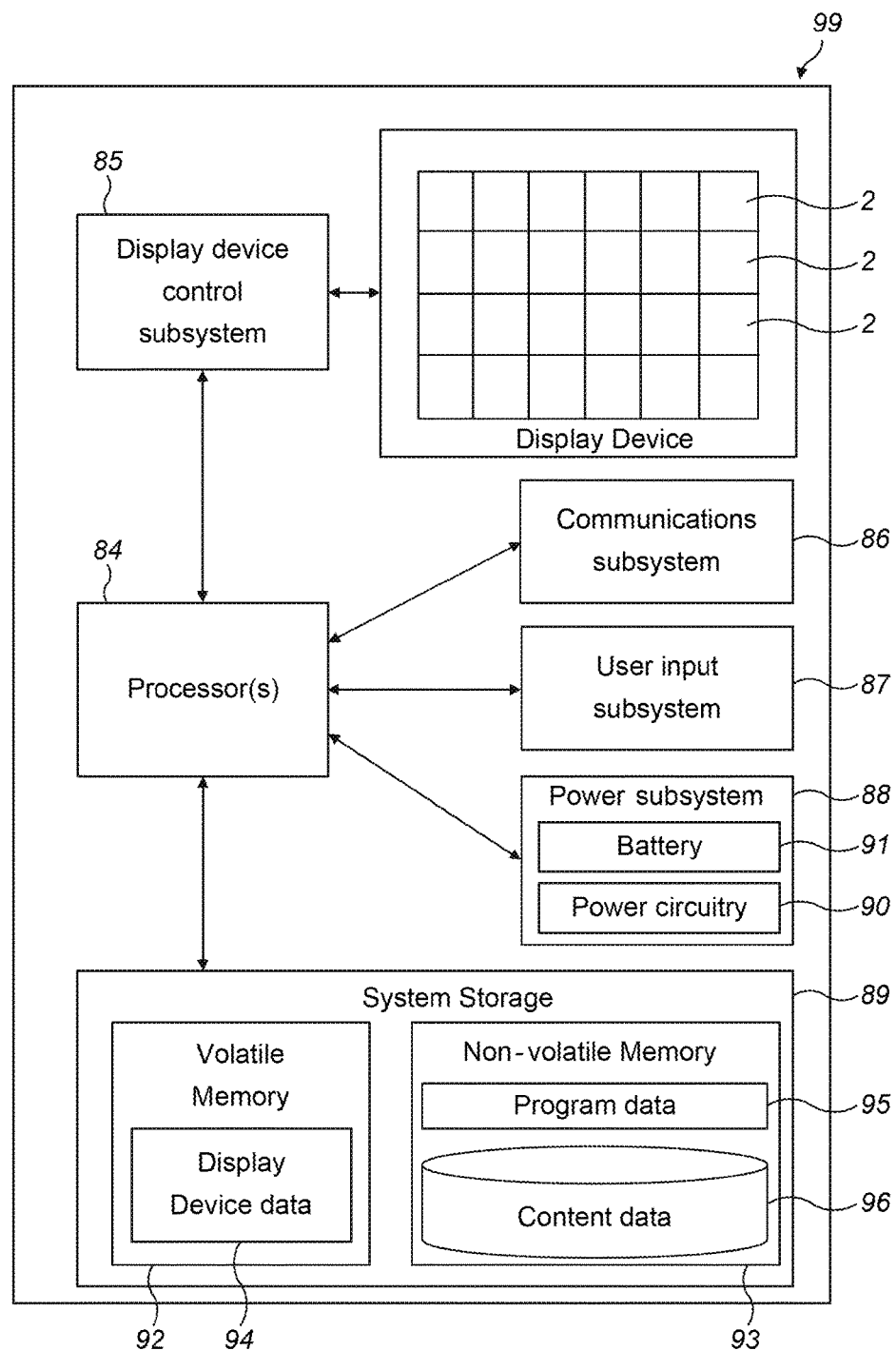
FIG. 13 shows a system comprising an electrowetting element of examples.

A system diagram illustrating an example of a basic hardware architecture of an apparatus including an electrowetting display device according to examples described herein, is shown in FIG. 13. The apparatus 99 includes at least one processor 84 connected to and therefore in data communication with for example: a display device control subsystem 85, a communications subsystem 86, a user input subsystem 87, a power subsystem 88 and system storage 89. The display device control subsystem is connected to and is therefore in data communication with the electrowetting display device 1. The at least one processor 84 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 89. The at least one processor may additionally, or in the alternative, contain memory, such as processor registers.

The display device control subsystem 85 for example includes electrowetting element driver components, for use in applying a voltage to any of the electrowetting elements, to address different such electrowetting elements. In examples the electrowetting elements are configured according to an active matrix configuration and the display device control subsystem is configured to control switching elements such as thin film transistors (TFTs) of the display device 1 via circuitry to control the electrowetting elements. The circuitry may include signal and control lines. For example, the display device control subsystem 85 may include display drivers such as display column drivers and display row drivers.

The communications subsystem 86 for example is configured for the apparatus to communicate with for example a computing device via a data network, for example a computer network such as the Internet, a local area network, a wide area network, a telecommunications network, a wired network, a wireless network, or some other type of network. The communications subsystem 86 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 87 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 88 for example includes power circuitry 90 for use in transferring and controlling power consumed by the apparatus. The power may be provided by a mains electricity supply or from a battery 91, via the power circuitry. The power circuitry may further be used for charging the battery from a mains electricity supply.

The system storage 89 includes at least one memory, for example at least one of volatile memory 92 and non-volatile memory 93 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a configuration of a portion of the first fluid of an electrowetting element of the array of electrowetting elements, for example to control a display effect provided by the electrowetting display device.

In the example of FIG. 13, the volatile memory 92 stores for example display device data 94 which is indicative of display effects to be provided by the display device 1. The processor 84 may transmit data, based on the display device data, to the display device control subsystem 85 which in turn outputs signals to the display device for applying voltages to the electrowetting elements, for providing display effects from the display device. The non-volatile memory 93 stores for example program data 95 and/or content data 96. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above examples are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. Apparatus comprising:
    a first electrowetting element comprising:
       a first fluid;
       a second fluid immiscible with the first fluid;
       a first surface of a support plate, the first surface having:
          a first surface portion lying in a first plane, and
          a second surface portion lying in a second plane different from the first plane;

a first electrode within the support plate; and
a second electrode in contact with the second fluid;
a second electrowetting element comprising:
a first fluid;
a second fluid immiscible with the first fluid;
a second surface of the support plate, the second surface having:
a first surface portion lying in a first plane, and
a second surface portion lying in a second plane different from the first plane; and
a first electrode within the support plate; and
a second electrode in contact with the second fluid;
at least one processor; and
at least one memory comprising computer program instructions, the at least one memory and the computer program instructions configured to, with the at least one processor, perform a method comprising:
receiving display effect data indicative of a requested display effect for display by each of the first electrowetting element and the second electrowetting element;
for the first electrowetting element, and based on the display effect data:
determining a first voltage value of a voltage to apply to the first electrode and the second electrode of the first electrowetting element;
generating the voltage with the first voltage value; and
applying the voltage with the first voltage value to the first electrode and the second electrode of the first electrowetting element, to switch the first electrowetting element to:
a state a) in which:
the first fluid contacts substantially all of the first surface portion, and
the first fluid contacts substantially all of the second surface portion;
or
a state b) in which:
the first fluid contacts a first part of the first surface portion,
the second fluid contacts substantially all of the second surface portion, and
the second fluid contacts a second part of the first surface portion;
for the second electrowetting element, and based on the display effect data indicative of the requested display effect:
determining a second voltage value of a voltage to apply to the first electrode and the second electrode of the second electrowetting element;
generating the voltage with the second voltage value; and
applying the voltage with the second voltage value to the first electrode and the second electrode of the second electrowetting element, to switch the second electrowetting element to a state in which:
the first fluid contacts substantially all of the first surface portion, and
the second fluid contacts substantially all of the second surface portion.

2. The apparatus of claim 1, the method further comprising, and the determining the first voltage value and the determining the second voltage value respectively based on:
comparing the requested display effect with a first available display effect and a second available display effect for each of the first electrowetting element and the second electrowetting element; and
determining that the requested display effect is between the first available display effect and the second available display effect.

3. The apparatus of claim 2, the first available display effect corresponding to the state a).

4. The apparatus of claim 2, the first available display effect corresponding to the state b).

5. The apparatus of claim 2, the second available display effect corresponding to the state in which:
the first fluid contacts substantially all of the first surface portion, and
the second fluid contacts substantially all of the second surface portion.

6. The apparatus of claim 1, comprising an array of electrowetting elements comprising the first electrowetting element and the second electrowetting element,
wherein the determining the first voltage value of the voltage to apply to the first electrode and the second electrode of the first electrowetting element is based on a position of the first electrowetting element in the array of electrowetting elements, and
wherein the determining the second voltage value of the voltage to apply to the first electrode and the second electrode of the second electrowetting element is based on a position of the second electrowetting element in the array of electrowetting elements.

7. The apparatus of claim 1, comprising an array of electrowetting elements comprising the first electrowetting element and the second electrowetting element,
wherein the determining the first voltage value of the voltage to apply to the first electrode and the second electrode of the first electrowetting element, and the determining the second voltage value of the voltage to apply to the first electrode and the second electrode of the second electrowetting element, is based on a position of the first electrowetting element relative to the second electrowetting element.

8. The apparatus of claim 1, comprising an array of electrowetting elements comprising the first electrowetting element and the second electrowetting element, the method further comprising:
receiving image data for an image to be displayed by the array of electrowetting elements, the image data comprising the display effect data;
based on the image data, determining a first spatial pattern of a first group of electrowetting elements of the array of electrowetting elements to switch to state a) or state b), the first group comprising the first electrowetting element; and
based on the image data, determining a second spatial pattern of a second group of electrowetting elements of the array of electrowetting elements to switch to the state in which:
the first fluid contacts substantially all of the first surface portion, and
the second fluid contacts substantially all of the second surface portion,
the second group comprising the second electrowetting element.

9. The apparatus of claim 1, wherein:
the requested display effect has a requested grey-scale level;
the state a) has a darker greyscale level than the state in which:
the first fluid contacts substantially all of the first surface portion, and the second fluid contacts substantially all of the second surface portion; and the state b) has a lighter greyscale level than the state in which:
the first fluid contacts substantially all of the first surface portion, and
the second fluid contacts substantially all of the second surface portion.

10. The apparatus of claim 1, wherein, the first surface and the second surface are each stepped between the respective first surface portion and the respective second surface portion.

11. The apparatus of claim 1, wherein, for each of the first surface and the second surface, the respective second surface portion is raised relative to the respective first surface portion.

12. The apparatus of claim 1, wherein, for each of the first electrowetting element and the second electrowetting element, the support plate comprises:
an electrode free portion free of the first electrode, the respective first surface portion overlapping the respective first electrode; and
a dielectric layer located between the respective electrode free portion and the respective second surface portion overlapping the respective electrode free portion.

13. The apparatus of claim 1, wherein each of the first surface and the second surface comprises a third surface portion joining the respective first surface portion lying in the first plane and the respective second surface portion lying in the second plane.

14. A method of controlling an array of electrowetting elements comprising a first electrowetting element and a second electrowetting element, the method comprising:
receiving display effect data indicative of a requested display effect for display by each of the first electrowetting element and the second electrowetting element;
for the first electrowetting element, and based on the display effect data:
determining a first voltage value of a voltage to apply to a first electrode and a second electrode of the first electrowetting element;
generating the voltage with the first voltage value; and
outputting the voltage with the first voltage value to be applied to the first electrode and the second electrode of the first electrowetting element, to switch the first electrowetting element to:
a state a) in which:
a first fluid contacts substantially all of a first surface portion of a first surface of a support plate, the first surface portion lying in a first plane of the first electrowetting element, and
the first fluid contacts substantially all of a second surface portion of the first surface, the second surface portion lying in a second plane of the first electrowetting element different from the first plane of the first electrowetting element;
or
a state b) in which:
the first fluid contacts a first part of the first surface portion,
a second fluid contacts substantially all of the second surface portion, and
the second fluid contacts a second part of the first surface portion;
for the second electrowetting element, and based on the display effect data indicative of the requested display effect:

determining a second voltage value of a voltage to apply to a first electrode and a second electrode of the second electrowetting element;
generating the voltage with the second voltage value; and
outputting the voltage with the second voltage value to be applied to the first electrode and the second electrode of the second electrowetting element, to switch the second electrowetting element to a state in which:
the first fluid contacts substantially all of a first surface portion of a second surface of the support plate, the first surface portion of the second surface lying in a first plane of the second electrowetting element, and
the second fluid contacts substantially all of a second surface portion of the second surface, the second surface portion lying in a second plane of the second electrowetting element different from the first plane of the second electrowetting element.

15. The method of claim 14, the method further comprising, and the determining the first voltage value and the determining the second voltage value respectively based on:
comparing the requested display effect with a first available display effect and a second available display effect for each of the first electrowetting element and the second electrowetting element;
determining that the requested display effect is between the first available display effect and the second available display effect.

16. The method of claim 15, the first available display effect corresponding to the state a) or the state b).

17. The method of claim 15, the second available display effect corresponding to the state in which:
the first fluid contacts substantially all of the first surface portion, and
the second fluid contacts substantially all of the second surface portion.

18. The method of claim 14, comprising:
determining a position of the first electrowetting element in the array of electrowetting elements,
the determining the first voltage value of the voltage to apply to the first electrode and the second electrode of the first electrowetting element being based on the position of the first electrowetting element; and
determining a position of the second electrowetting element in the array of electrowetting elements,
the determining the second voltage value of the voltage to apply to the first electrode and the second electrode of the second electrowetting element being based on the position of the second electrowetting element.

19. The method of claim 14, further comprising:
receiving image data for an image to be displayed by the array of electrowetting elements, the image data comprising the display effect data;
based on the image data, determining a first spatial pattern of a first group of electrowetting elements of the array of electrowetting elements to switch to the state a) or the state b), the first group comprising the first electrowetting element; and
based on the image data, determining a second spatial pattern of a second group of electrowetting elements of the array of electrowetting elements to switch to the state in which:
the first fluid contacts substantially all of the first surface portion, and
the second fluid contacts substantially all of the second surface portion the second group comprising the second electrowetting element.

20. The method of claim 14, wherein the requested display effect has a requested grey-scale level;

the state a) has a darker greyscale level than the state in which:
 the first fluid contacts substantially all of the first surface portion, and
 the second fluid contacts substantially all of the second surface portion; and the state b) has a lighter greyscale level than the state in which:
 the first fluid contacts substantially all of the first surface portion, and
 the second fluid contacts substantially all of the second surface portion.

\* \* \* \* \*